W. E. MORRISON & F. F. MINNICH.
CULINARY UTENSIL.
APPLICATION FILED OCT. 19, 1908.
967,954.
Patented Aug. 23, 1910.
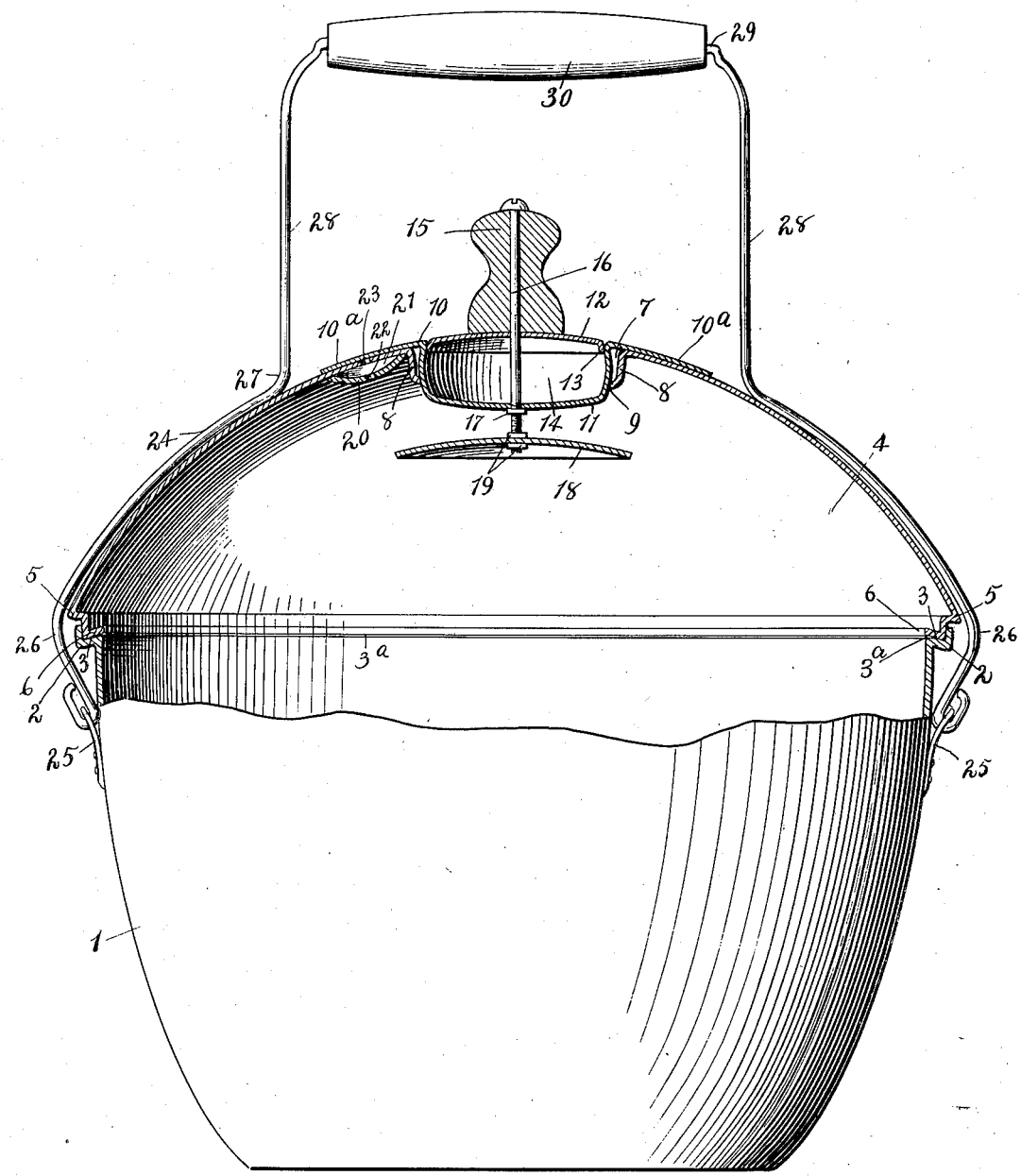
Witnesses:
C. F. Bassett
M. A. Milord
Inventors
Wm. E. Morrison
Frederick F. Minnich
By Frederick Benjamin
Atty

UNITED STATES PATENT OFFICE.

WILLIAM E. MORRISON AND FREDERICK F. MINNICH, OF CHICAGO, ILLINOIS.

CULINARY UTENSIL.

967,954.  Specification of Letters Patent. Patented Aug. 23, 1910.

Application filed October 19, 1908. Serial No. 458,427.

*To all whom it may concern:*

Be it known that we, WILLIAM E. MORRISON and FREDERICK F. MINNICH, citizens of the United States, residing at Chicago, in the county of Cook and State of Illinois, have invented certain new and useful Improvements in Culinary Utensils, of which the following is a specification.

Our invention relates to domestic cooking vessels and refers particularly to pots and the covers therefor.

The chief objects of the improvements forming the subject matter of this application are:—to provide a pot and cover presenting mutually interlocking portions adapted to form a tight joint therebetween; to furnish means for retaining the cover in its seat upon the pot, and to make provision for permitting the steam to escape through a vent in the cover when the pressure reaches a predetermined degree.

Further objects of this invention are:—to furnish a safety valve for the vent opening, and to provide an alarm for indicating the position of the safety valve, when the latter is elevated.

We accomplish the above and other minor results by means of the appliance illustrated in the accompanying drawing, forming a part of this application, the details of construction being disclosed in a single view which is partly an elevation and partly a vertical section of a cooking vessel with a cover applied thereto.

Referring to the details of construction, the numeral 1 indicates a pot or kettle, provided with a marginal offset 2, forming an annular shoulder 3, which is inclined downwardly and outwardly in the manner indicated in the drawing. The pot is supplied with a lid or cover 4 having its outer edge bent inward and then downward to form an inset 5, the extreme margin being then bent inward and slightly inclined upward to form an annular flange 6, which rests upon the shoulder 3 of the pot, to form a tight joint at 3ª. The center of the cover 4 is furnished with a comparatively large circular aperture 7, having its margins bent abruptly downward, as indicated at 8, and then slightly curved inward to form a valve seat 9. Within this aperture and normally closing the same is a safety valve constructed as follows:—A circular piece of sheet metal 10 of suitable gage has its central portion depressed to form a body 11, circular in outline, and adapted to fit snugly in the opening of the valve seat 9, and forming a steam tight joint between the body and said seat. The margin 10ª of the said plate is slightly curved to correspond with the curvature of the cover, and normally rests upon the outer surface of said cover. The depression in the plate is closed above by a thin metal disk 12 preferably having its margins turned, as shown at 13, and securely fixed in position by soldering, thus producing an air tight cavity 14 in the body of the valve.

Upon the upper surface of the disk 12, forming the upper portion of the body of the safety valve is mounted a knob 15, secured to the body by a screw bolt 16, furnished with a nut 17. The said bolt fits snugly in the knob 15 and in the apertures in the body of the valve. The lower end of the said bolt projects below the valve forming a valve stem and carries upon the extremity a disk of sheet metal 18, held in place by nuts 19.

On the under side of the cover in close proximity to the valve is located an audible indicating device or alarm in the form of a whistle operable by the steam generated in the vessel. This device consists of a concave disk 20 of thin metal soldered to the under surface of the cover with its concave side uppermost, thus forming a cavity 21 between the two parts. The disk has a central orifice 22 and the cover is supplied with a similar hole 23 which registers with the orifice 21, the construction producing a well known form of whistle.

In order to secure the cover in place and exert pressure thereon to counteract the force of the confined steam, we provide a device in the form of a bail 24, secured at each end to ears 25 in the usual manner. This bail differs from the ordinary pot bail by having each side bent inwardly at 26, opposite the junction of the cover and pot, and then given a curve approximating that of the cover, after which it is bent abruptly at 27 and continued upwardly, forming vertical parallel portions 28, which extend to a suitable distance above the cover, and are then joined by the middle horizontal portion 29 furnished with a handle 30. It will be readily seen that this bail may be arranged to exert considerable pressure upon the cover, particularly if made of comparatively heavy wire, and the said wire may be adjusted by bending so that the pressure upon the cover at the points 27 may be varied, this adjustability being an important feature since the bail, being used to lift and carry the kettle and contents may in time become sprung from its original shape by the weight thus applied, and require rebending.

The operation of the device is as follows:—The materials to be cooked, together with the requisite quantity of water, having been placed in the pot and covered with the lid 4, the latter is locked upon its seat by turning the bail to the position shown in the drawing. The valve, if accurately adjusted, will fall by its own weight to the position shown, with its body 11 engaging the seat 9 and the margin $10^a$ in apposition with the outer surface of the lid or cover 4, closing the orifice 23 of the whistle and preventing the escape of steam therethrough, the whistle thus remaining inoperative so long as the valve is seated. As the body of the valve is made of comparatively thin material and slightly tapering where it comes in contact with the valve seat 9, the adjustment may be such that some force will be required to seat the valve and consequently a greater steam pressure will be required to raise it. Heat having been applied to the pot in the usual manner, no further attention will be required until sufficient steam has been generated to raise the valve from its seat. When the valve is thus unseated the disk 18 will close the orifice 7, and the only vent will be through the orifices 22, 23, and the steam passing therethrough will sound the whistle, thus indicating to the attendant that the water has reached its maximum degree of heat, and the gas, or other fuel supply, may be correspondingly lessened in the interest of economy. As soon as the escape of the steam and diminution of the heat applied to the pot has reduced the interior pressure to a sufficient degree, the valve will descend until reseated, and the flange $10^a$ will cover the orifice 23 thus stopping the alarm, and no further appreciable escape of steam will occur until the pressure is again raised. The knob 15 serves the usual purpose of a handle for the cover, and when the knob is raised the disk 18 acts incidentally as a protector for the fingers when grasping the knob, by preventing the escape of hot steam through the aperture 7.

Having thus described our invention, what we claim, is:—

1. A cooking utensil, including a cover provided with a central aperture, a valve controlling said aperture, means for closing said aperture when the valve is raised, an audible steam operated signal, and means attached to said valve for rendering the said signal inoperative when the valve is seated.

2. In a cooking vessel, the combination with a pot, and a cover therefor provided with a central aperture, of a valve controlling said aperture, an audible indicating device arranged on the cover, and means on said valve for controlling the indicating device.

3. In a cooking utensil, the combination with a pot, and a cover therefor having a central opening, an orifice in the cover adjacent said opening, a concavo-convex disk attached to the under side of the cover and having an aperture registering with the said orifice, a valve controlling the central opening in the cover and having a flange extending laterally from said valve and adapted to engage the outer face of the cover, and to cover said orifice.

4. In a cooking utensil, the combination with a pot having an annular shoulder, of a cover provided with a central opening, an annular flange on the cover adapted to engage said shoulder, an audible indicating device attached to the cover and having an external aperture, a valve arranged in said central opening and having a flange adapted to control the said external aperture, and a bail attached to the pot and adapted to frictionally engage and lock said cover upon the pot.

5. In a cooking utensil, the combination with a pot, having an annular marginal shoulder thereon, of a cover having a central opening and an annular flange adapted to engage said shoulder, a whistle comprising a concave disk attached to the under side of the cover and furnished with an aperture adapted to register with a similar orifice in the cover, a valve controlling the central opening of the cover and having a flange controlling the said orifice in the cover, and means on said valve for controlling the said central opening when the valve is raised, and a handle for the pot, said handle being also adapted to engage and lock the cover upon its seat.

In testimony whereof we affix our signatures in the presence of two witnesses.

WILLIAM E. MORRISON.
FREDERICK F. MINNICH.

Witnesses:
FREDERICK BENJAMIN,
H. DE LOS HIGMAN.